(12) United States Patent
Han et al.

(10) Patent No.: US 12,014,741 B2
(45) Date of Patent: Jun. 18, 2024

(54) ELECTRONIC DEVICE AND CONTROLLING METHOD THEREOF

(71) Applicant: SAMSUNG ELECTRONICS CO., LTD., Suwon-si (KR)

(72) Inventors: Jubum Han, Suwon-si (KR); Yeaseul Song, Suwon-si (KR); Jaewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 17/503,849

(22) Filed: Oct. 18, 2021

(65) Prior Publication Data

US 2022/0270616 A1 Aug. 25, 2022

Related U.S. Application Data

(63) Continuation of application No. PCT/KR2021/012596, filed on Sep. 15, 2021.

(30) Foreign Application Priority Data

Feb. 23, 2021 (KR) ........................ 10-2021-0023992

(51) Int. Cl.
*G10L 17/18* (2013.01)
*G06N 3/045* (2023.01)
(Continued)

(52) U.S. Cl.
CPC .............. *G10L 17/18* (2013.01); *G06N 3/045* (2023.01); *G10L 15/08* (2013.01); *G10L 25/78* (2013.01); *G10L 2015/088* (2013.01)

(58) Field of Classification Search
CPC ......... G10L 17/18; G10L 15/08; G10L 25/78; G10L 2015/088; G06N 3/045; G06N 3/08; H04R 1/1016; H04R 1/1091
See application file for complete search history.

(56) References Cited

U.S. PATENT DOCUMENTS

| 9,633,659 B1 * | 4/2017 | Agrawal ................ H04M 1/724 |
| 10,397,736 B2 * | 8/2019 | Lee ......................... G10L 25/51 |

(Continued)

FOREIGN PATENT DOCUMENTS

| CN | 105225662 A | 1/2016 |
| CN | 111800700 A | 10/2020 |

(Continued)

OTHER PUBLICATIONS

International Search Report (PCT/ISA/210) and Written Opinion (PCT/ISA/237) dated Dec. 27, 2021 issued by the International Searching Authority in International Application No. PCT/KR2021/012596.

(Continued)

*Primary Examiner* — Fariba Sirjani
(74) *Attorney, Agent, or Firm* — Sughrue Mion, PLLC

(57) ABSTRACT

An electronic device including a microphone; an output interface; and a processor configured to: based on a word registered on the electronic device by a user, detect a voice of a talker who utters the registered word from an audio signal received through the microphone; based on voice information of a registered talker who is registered on the electronic device, determine whether the detected voice is a voice of the registered talker; and based on the detected voice being determined as the voice of the registered talker, control the output interface to output a voice notification, wherein the registered word refers to the user.

15 Claims, 10 Drawing Sheets

(51) Int. Cl.
*G10L 15/08* (2006.01)
*G10L 25/78* (2013.01)

(56) References Cited

U.S. PATENT DOCUMENTS

| | | | |
|---|---|---|---|
| 10,636,420 B2* | 4/2020 | Kang | G10L 17/02 |
| 10,984,795 B2* | 4/2021 | Xie | G10L 17/06 |
| 2006/0083387 A1* | 4/2006 | Emoto | H04R 1/1083 |
| | | | 381/74 |
| 2015/0161370 A1* | 6/2015 | North | G07C 9/37 |
| | | | 726/5 |
| 2018/0137865 A1 | 5/2018 | Ling | |
| 2018/0197539 A1* | 7/2018 | Kang | G10L 15/1815 |
| 2019/0052999 A1* | 2/2019 | Lee | H04W 76/14 |
| 2019/0341041 A1* | 11/2019 | Xie | G10L 17/04 |
| 2020/0037094 A1* | 1/2020 | Hosoda | G06Q 30/0261 |
| 2020/0135230 A1* | 4/2020 | Tong | G10L 25/78 |
| 2020/0349942 A1 | 11/2020 | Ahn et al. | |
| 2020/0380980 A1 | 12/2020 | Shum et al. | |
| 2021/0020177 A1* | 1/2021 | Oh | G06F 3/16 |
| 2021/0134302 A1* | 5/2021 | Kwon | G10L 17/06 |
| 2021/0183396 A1* | 6/2021 | Liu | G10L 21/0216 |
| 2021/0256979 A1 | 8/2021 | Zhang et al. | |
| 2022/0020387 A1* | 1/2022 | Paquier | G10K 11/17837 |
| 2022/0066207 A1* | 3/2022 | Croxford | H04R 3/005 |
| 2022/0270616 A1* | 8/2022 | Han | G06N 3/045 |

FOREIGN PATENT DOCUMENTS

| | | |
|---|---|---|
| KR | 10-0622212 B1 | 9/2006 |
| KR | 10-2007-0070389 A | 7/2007 |
| KR | 1020180081922 A | 7/2018 |
| KR | 10-1993827 B1 | 6/2019 |
| KR | 1020190114325 A | 10/2019 |
| KR | 1020190119521 A | 10/2019 |
| KR | 1020200126675 A | 11/2020 |
| KR | 10-2021-0015917 A | 2/2021 |
| KR | 10-2021-0053722 A | 5/2021 |

OTHER PUBLICATIONS

Extended European Search Report dated Mar. 4, 2024 in European Application No. 21928205.0.

* cited by examiner

ELECTRONIC DEVICE AND CONTROLLING METHOD THEREOF

CROSS-REFERENCE TO RELATED APPLICATION(S)

This application is a bypass continuation of International Application No. PCT/KR2021/012596, filed on Sep. 15, 2021, which is based on and claims priority to Korean Patent Application No. 10-2021-0023992, filed on Feb. 23, 2021, in the Korean Intellectual Property Office, the disclosures of which are incorporated by reference herein in their entireties.

BACKGROUND

1. Field

The disclosure relates to an electronic device and a controlling method thereof, and more particularly to an electronic device for collecting and providing surrounding voice information and a controlling method thereof.

2. Description of the Related Art

In recent years, electronic devices such as wireless earphones, wireless headphones, and the like, which output audio signals received from mobile devices via wireless communication, have been commercialized.

However, there is a problem that a user may not hear a voice of another person who is calling the user, because it is difficult to hear voice information around the user while the user is wearing and using such electronic devices.

SUMMARY

Provided is an electronic device for collecting and outputting surrounding voice information and a controlling method thereof.

In accordance with an aspect of the disclosure, an electronic device includes a microphone; an output interface; and a processor configured to: based on a word registered on the electronic device by a user, detect a voice of a talker who utters the registered word from an audio signal received through the microphone; based on voice information of a registered talker who is registered on the electronic device, determine whether the detected voice is a voice of the registered talker; and based on the detected voice being determined as the voice of the registered talker, control the output interface to output a voice notification, wherein the registered word refers to the user.

The voice notification may indicate that the registered talker is calling the user.

The processor may be further configured to: input a voice for the registered word to a first neural network model and obtain a first output value from the first neural network model; input a voice obtained using the microphone to the first neural network model and obtain a second output value from the first neural network model; and detect the voice of the talker who utters the registered word from the audio signal received through the microphone based on the first output value and the second output value.

The processor may be further configured to obtain the voice for the registered word based on at least one of a text and a voice of the user that is input to the electronic device to register the word.

The processor may be further configured to: input the voice for the registered word and the voice information of the registered talker to a second neural network model and obtain a converted voice that is converted from the voice for the registered word based on a voice style of the registered talker; and determine whether the detected voice is the voice of the registered talker based on the converted voice.

The processor may be further configured to: input the converted voice to a third neural network model and obtain a third output value from the third neural network model; input the detected voice to the third neural network model and obtain a fourth output value from the third neural network model; and determine whether the detected voice is the voice of the registered talker based on the third output value and the fourth output value.

The voice information of the registered talker may include a voice uttered by the registered talker.

The processor may be further configured to, based on the detected voice not being determined as the voice of the registered talker, store voice information of the talker in the electronic device by using the detected voice.

In accordance with an aspect of the disclosure, a method for controlling an electronic device including a microphone includes based on a word registered on the electronic device by a user, detecting a voice of a talker who utters the registered word from an audio signal received through the microphone; based on voice information of a registered talker who is registered on the electronic device, determining whether the detected voice is a voice of the registered talker; and based on the detected voice being determined as the voice of the registered talker, outputting a voice notification, wherein the registered word refers to the user.

The voice notification may indicate that the registered talker is calling the user.

The method may further include inputting voice for the registered word to a first neural network model and obtaining a first output value from the first neural network model; inputting a voice obtained using the microphone to the first neural network model and obtaining a second output value from the first neural network model; and identifying the voice of the talker who utters the registered word from the audio signal received through the microphone based on the first output value and the second output value.

The method may further include obtaining the voice for the registered word based on at least one of a text and a voice of the user that is input to the electronic device to register the word.

The method may further include inputting the voice for the registered word and the voice information of the registered talker to a second neural network model and obtaining a converted voice that is converted from the voice for the registered word based on a voice style of the registered talker; and determining whether the detected voice is the voice of the registered talker based on the converted voice.

The method may further include inputting the converted voice to a third neural network model and obtaining a third output value from the third neural network model; inputting the detected voice to the third neural network model and obtaining a fourth output value from the third neural network model; and determining whether the detected voice is the voice of the registered talker based on the third output value and the fourth output value.

The voice information of the registered talker may include a voice uttered by the registered talker.

According to various aspects of the disclosure, when an utterer registered on the electronic device is calling the user wearing the electronic device, a voice notification for that may be provided to the user. Therefore, the user convenience may be enhanced.

DETAILED DESCRIPTION

Figure 1:
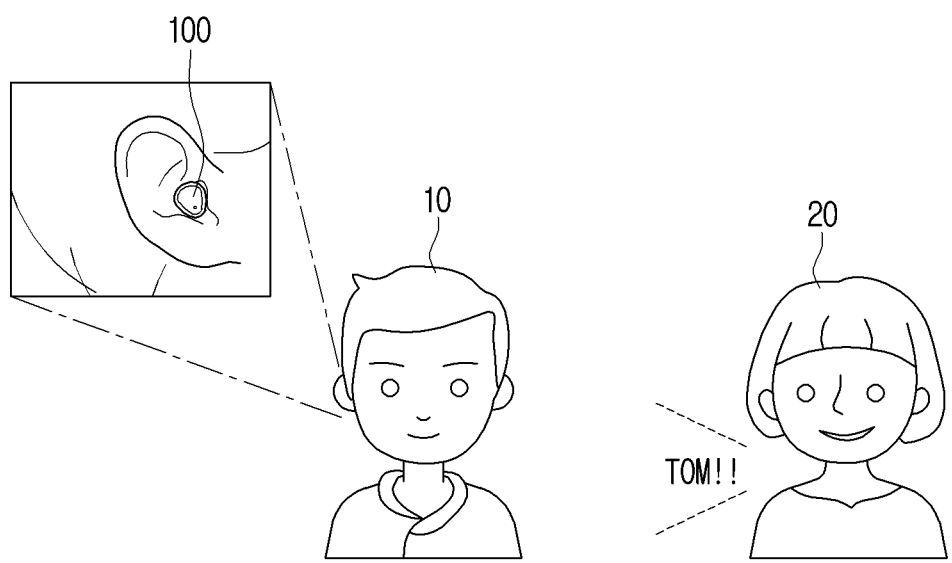
FIG. 1 is a diagram illustrating an electronic device according to an embodiment.

In describing the disclosure, a detailed description of the related art or configuration may be omitted when it is determined that the detailed description may unnecessarily obscure a gist of the disclosure. In addition, the embodiments below may be changed in various forms and the scope of the technical idea of the disclosure is not limited to the embodiments below. The embodiments are provided to complete the disclosure and completely transfer the technical idea of the disclosure to those skilled in the art.

It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

The expressions "first," "second" and the like used in the disclosure may denote various elements, regardless of order and/or importance, and may be used to distinguish one element from another, and does not limit the elements.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. The expression "configured to (or set to)" does not necessarily refer to a device being "specifically designed to" in terms of hardware. Instead, under some circumstances, the expression "a device configured to" may refer to the device being "capable of" performing an operation together with another device or component. For example, the phrase "a processor configured (or set) to perform A, B, and C" may refer, for example, and without limitation, to a dedicated processor (e.g., an embedded processor) for performing the corresponding operations, a generic-purpose processor (e.g., a CPU or an application processor), or the like, that can perform the operations by executing one or more software programs stored in a memory device.

FIG. 1 is a diagram illustrating an electronic device according to an embodiment.

Referring to FIG. 1, an electronic device 100 according to an embodiment of the disclosure may output an audio signal. For example, the electronic device 100 may output an audio signal stored in the electronic device 100 or receive an audio signal from an external electronic device connected in a wired or wireless manner and output the received audio signal.

In this case, the electronic device 100 may be implemented as earphones or headphones that output acoustic information while being worn on ears of a user or covering the ears of the user.

Meanwhile, a user 10 who is wearing the electronic device 100 may experience difficulty to hear a voice of another user 20, who is calling the user 10, due to the audio signal output from the electronic device 100.

The electronic device 100 according to an embodiment of the disclosure may receive a surrounding audio signal, and if a voice of another user, who is calling the user, is identified from the received audio signal, the electronic device 100 may output a voice notification for notifying that another user is calling the user.

Therefore, according to an embodiment of the disclosure, the user may recognize a situation in which another user is calling the user while wearing the electronic device 100, thereby enhancing convenience.

Figure 2:
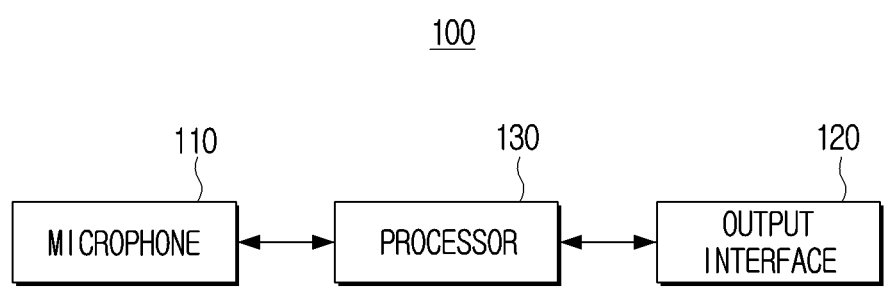
FIG. 2 is a block diagram illustrating a configuration of the electronic device according to an embodiment.

FIG. 2 is a block diagram illustrating a configuration of the electronic device according to an embodiment.

Referring to FIG. 2, the electronic device 100 may include a microphone 110, an output interface 120, and a processor 130.

The microphone 110 may be a configuration for receiving an audio signal. In other words, the microphone 110 may receive surrounding sounds as audio signals. In this case, the microphone 110 may continuously receive audio signals. The audio signal may include information on a specific frequency, an amplitude, a number of vibrations, a waveform, and the like for each time, and the audio signal may be in a form of an analogue signal or a digital signal.

The output interface 120 may be a configuration for outputting the audio signal. For example, the output interface 120 may move a voice coil using an electric signal and vibrate a diaphragm attached to the voice coil along with the movement of the voice coil to reproduce the audio signal.

The processor 130 may control general operations of the electronic device 100. For this, the processor 130 may be a general-purpose processor such as a central processing unit (CPU) or an application processor (AP), a graphic dedicated processor such as a graphic processing unit (GPU) or a vision processing unit (VPU), or an artificial intelligence dedicated processor such as a neural processing unit (NPU), or the like. In addition, the processor 130 may include a volatile memory for loading at least one instruction or module.

Figure 3:
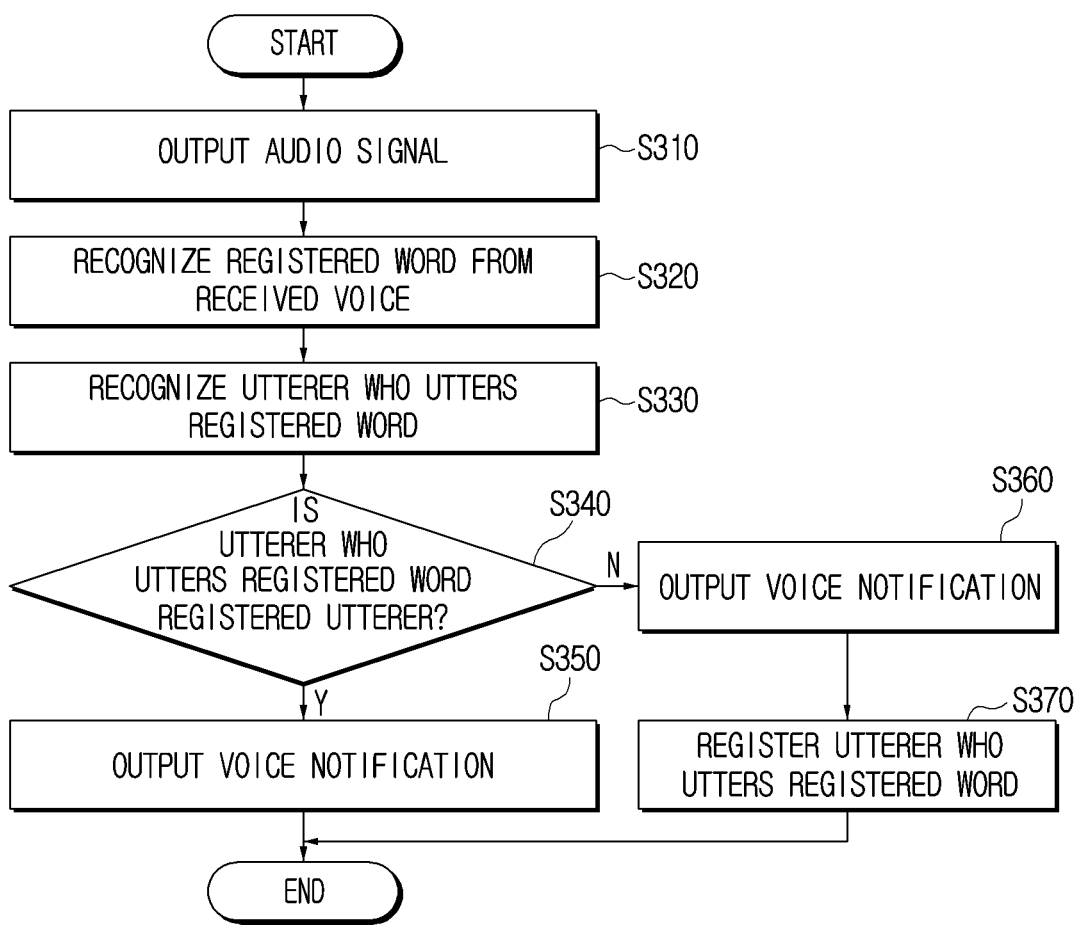
FIG. 3 is a flowchart illustrating an operation of the electronic device according to an embodiment.

Hereinafter, the operations of the disclosure will be described in more detail with reference to FIG. 3.

First, the processor 130 may output an audio signal via the output interface 120 at operation S310.

Specifically, the processor 130 may output the audio signal stored in a memory 140 (see FIG. 7) of the electronic device 100 via the output interface 120, or receive the audio signal from an external electronic device connected in a wired or wireless manner and output the received audio signal via the output interface 120.

For example, the external electronic device may receive a music content from a server providing a music content streaming service, and transmit the received music content to the electronic device 100. In this case, the processor 130 may control the output interface 120 to output the music content received from an electronic device 200.

In addition, based on a word (or keyword) registered on the electronic device 100 by the user, the processor 130 may identify a voice of a talker who utters the registered word from the audio signal received via the microphone 110. In embodiments, the term "talker" may refer to an utterer who utters a particular word, which may mean a person who utters or speaks a particular word. In other words, the processor 130 may recognize the registered word from the voice received from the microphone 110 at operation S320.

For this, the processor 130 may detect the voice from the audio signal received via the microphone 110. For example, the processor 130 may detect an audio signal in a section where a level exceeds a predetermined level, among audio signals continuously received via the microphone 110, as a voice signal. This is for reducing a number of targets of data processing to reduce an amount of operation, by identifying the audio signal in a certain section among the audio signals as the voice signal and performing the processing only with respect to the voice signal. Meanwhile, the level of the audio signal may be a unit of a decibel (dB), a voltage, or an energy. However, this is merely an example, and the processor 130 may detect the voice from the audio signal received via the microphone 110 by using various well-known methods.

The processor 130 may identify the voice of the talker who utters the registered word from the detected voice.

The word herein may be registered on the electronic device 100 in advance. In other words, information on the word may be stored in the memory 140 in advance.

In this case, the processor 130 may register the word based on a user input. Specifically, the processor 130 may store the information on the word received according to the user input for registering the word in the memory 140.

For example, the user may register the word by using a voice. In this case, in the process for registering the word, when the voice uttered by the user is received via the microphone 110, the processor 130 may store the received voice data in the memory 140.

In another example, the user may input the word to an external electronic device using a virtual keyboard displayed on the external electronic device. In this case, the external electronic device may transmit text data for the input word to the electronic device 100. In the process for registering the word, if the word in a text form is received from the external electronic device, the processor 130 may store the received text data in the memory 140.

Meanwhile, the registered word may include a word referring to the user. For example, the word may include a word that is normally used by another person to call the user, such as a name, a position, and the like of the user.

Meanwhile, the processor 130 may identify the voice of the talker who utters the registered word by using a first neural network model.

Specifically, the processor 130 may input each of a voice for the registered word and a voice received via the microphone 110 to the first neural network model, and identify the voice of the talker who utters the registered word.

The first neural network model herein may be a classification model trained to classify the voice. For example, the first neural network model may be trained by using a set of training data including a plurality of voices (e.g., voice data) and a label for each voice. In this case, the label for each voice may be a word represented by each voice. In addition, when the processor 130 input a voice (that is, voice data) to the first neural network model, the first neural network model may output a label to which the input voice belongs as a result value.

First, the processor 130 may input the voice for the registered word to the first neural network model and obtain an output value (a first output value) from the first neural network model.

For this, the processor 130 may obtain the voice for the registered word. The voice for the registered word herein may be a voice representing the registered word in a voice form.

Specifically, the processor 130 may obtain the voice for the registered word based on at least one of a text and a user's voice input to the electronic device 100 for registering the word.

For example, if the user has registered the word using a voice, the memory 140 may store the user's voice obtained by uttering the registered word. In this case, the processor 130 may obtain the voice for the registered word by using voice data stored in the memory 140.

In another example, if the user has registered the word by using a virtual keyboard displayed on the external electronic device, the memory 140 may store text data for the registered word. In this case, the processor 130 may convert the text data into voice data by using a text-to-speech (TTS) module to obtain the voice for the registered word.

Accordingly, the processor 130 may input the voice for the registered word to the first neural network model to obtain the output value (a first output value) from the first neural network model.

The output value herein may be not a final output value of the first neural network model, but may be an output value (that is, vector value) obtained from one layer of a plurality of layers configuring the first neural network model.

Specifically, the first neural network model may include a convolutional layer, a pooling layer, a fully connected layer, and the like. In this case, the processor 130 may input the voice for the registered word to the first neural network model and obtain the output value from one layer (e.g., embedding layer) from the fully connected layer positioned on a rear part of the first neural network model.

In addition, the processor 130 may input the voice received via the microphone 110 to the first neural network model to obtain the output value (a second output value) from the first neural network model.

The output value herein may be not a final output value of the first neural network model, but may be an output value (that is, vector value) obtained from one layer of a plurality of layers configuring the first neural network model.

Specifically, the first neural network model may include a convolutional layer, a pooling layer, a fully connected layer, and the like. In this case, the processor 130 may input the voice received via the microphone 110 to the first neural network model and obtain the output value from one layer (e.g., embedding layer) from the fully connected layer positioned on a rear part of the first neural network model.

In addition, the processor 130 may identify the voice of the talker who utters the registered word from the audio signal received via the microphone 110 based on the output values obtained from the first neural network model.

Specifically, if a difference between the output value (a first output value) obtained by inputting the voice for the registered word to the first neural network model and the output value (a second output value) obtained by inputting the voice received via the microphone 110 to the first neural network model is equal to or less than a predetermined value, the processor 130 may identify that the voice received via the microphone 110 as the voice of the talker who utters the registered word. In addition, if the difference between the output value (a first output value) obtained by inputting the voice for the registered word to the first neural network model and the output value (a second output value) obtained by inputting the voice received via the microphone 110 to the first neural network model is more than the predetermined value, the processor 130 may determine that the voice received via the microphone 110 is not the voice of the talker who utters the registered word.

For example, the difference between the output values herein may be obtained by calculating a distance between inner output values (that is, vector values) through product calculation.

As described above, the processor 130 may perform the process described above with respect to the voice received via the microphone 110 to identify the voice of the talker who utters the registered word among the voices received via the microphone 110.

Then, the processor 130 may identify whether the identified voice is a voice of a registered talker based on the voice information of a talker registered on the electronic device 100. In other words, the processor 130 may recognize whether the talker who utters the registered word is the registered talker at operation S330.

The processor 130 may input the voice for the registered word and the voice information of the registered talker to the second neural network model to obtain a voice converted from the voice for the registered word based on a voice style of the registered talker.

The voice information of the registered talker herein may include a voice uttered by the registered talker. In other words, the memory 140 may store voice data of the registered talker in advance. For example, during the conversation between the user wearing the electronic device 100 and the talker, the processor 130 may receive the voice of the talker via the microphone 110 and store the received voice in the memory 140 for each talker.

Meanwhile, the second neural network model may be a model trained to convert the voice according to a style of a target voice. For example, the second neural network model may receive an input of a voice and a target voice, convert the input voice so that the input voice has the style of the target voice by using characteristics (e.g., a tone, an intonation, an utterance speed, an accent, and the like) of the input target voice, and output the converted voice. As described above, the second neural network model may perform voice conversion (or voice impersonation). In this case, for example, the second neural network model may include an encoder, a decoder, and the like and may be implemented as various models based on generative adversarial network (GAN).

Accordingly, the processor 130 may input the voice for the registered word and the voice of the registered talker to the second neural network model to obtain a voice which seems that the registered talker utters the registered word, from the second neural network model.

The processor 130 may identify whether the voice of the talker who utters the registered word is the voice of the registered talker, based on the voice obtained from the second neural network model, that is, the converted voice.

In this case, the processor 130 may identify whether the voice of the talker who utters the registered word is the voice of the registered talker by using a third neural network model.

Specifically, the processor 130 may input each of the converted voice and the voice of the talker who utters the registered word to the third neural network model to identify whether the voice of the talker who utters the registered word is the voice of the registered talker.

The third neural network model herein may be a classification model trained to classify a voice. For example, the third neural network model may be trained by using a set of training data including a plurality of voices and a label for each voice. In this case, the label for each voice may be a person who utters each voice. When the voice is input, the third neural network model may output the label to which the input voice belongs as a result value.

First, the processor 130 may input the converted voice to the third neural network model to obtain an output value (a third output value) from the third neural network model.

The output value herein may be not a final output value of the third neural network model, but may be an output value (that is, vector value) obtained from one layer of a plurality of layers configuring the third neural network model.

Specifically, the third neural network model may include a convolutional layer, a pooling layer, a fully connected layer, and the like. In this case, the processor 130 may input the converted voice to the third neural network model and obtain the output value from one layer (e.g., embedding layer) from the fully connected layer positioned on a rear part of the third neural network model.

In addition, the processor 130 may input the voice of the talker who utters the registered word to the third neural network model to obtain the output value (a fourth output value) from the third neural network model.

The output value herein may be not a final output value of the third neural network model, but may be an output value (that is, vector value) obtained from one layer of a plurality of layers configuring the third neural network model.

Specifically, the third neural network model may include a convolutional layer, a pooling layer, a fully connected layer, and the like. In this case, the processor 130 may input the voice of the talker who utters the registered word to the third neural network model and obtain the output value from one layer (e.g., embedding layer) from the fully connected layer positioned on a rear part of the third neural network model.

The processor 130 may identify whether the voice of the talker who utters the registered word is the voice of the registered talker based on the output values obtained from the third neural network model.

Specifically, if a difference between the output value (a third output value) obtained by inputting the converted voice to the third neural network model and the output value (a fourth output value) obtained by inputting the voice of the talker who utters the registered word to the third neural network model is equal to or less than a predetermined value, the processor 130 may identify that the voice of the talker who utters the registered word as the voice of the registered talker. In addition, if the difference between the output value (a third output value) obtained by inputting the converted voice to the third neural network model and the output value (a fourth output value) obtained by inputting the voice of the talker who utters the registered word to the third neural network model is greater than the predetermined value, the processor 130 may identify that the voice of the talker who talkers the registered word as not the voice of the registered talker.

For example, the difference between the output values herein may be obtained by calculating a distance between output values (that is, vector values) through inner product calculation.

Through the above method, the processor 130 may identify whether the voice of the talker who utters the registered word as the voice of the registered talker at operation S340.

When the voice of the talker who utters the registered word is identified as the voice of the registered talker (yes at operation S340), the processor 130 may control the output interface 120 to output a voice notification at operation S350.

The voice notification herein may include a voice notification for notifying that the registered talker is calling the user.

Figure 4A:
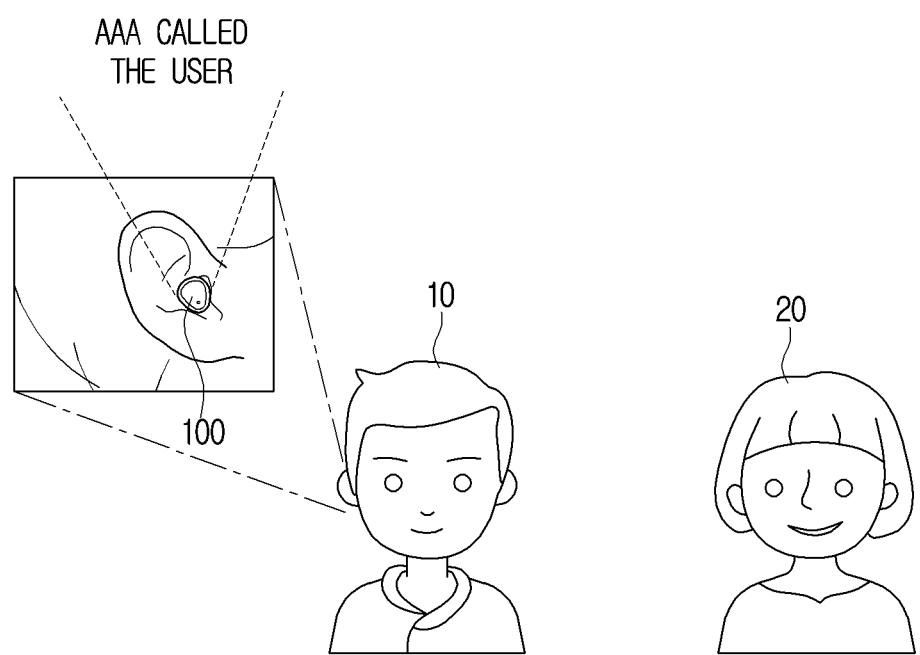
FIGS. 4A and 4B are diagrams illustrating examples of a voice notification output from the electronic device according to an embodiment.

For example, it is assumed that the voice of the talker who utters the registered word received through the microphone 110 is a voice of a registered talker AAA. In this case, referring to FIG. 4A, the processor 130 may output a voice notification "AAA called the user" via the output interface 120.

In this case, if the sound is being output via the output interface 120, the processor 130 may stop the output of the sound which was being output via the output interface 120 and output the voice notification via the output interface 120. After the voice notification is output via the output interface 120, the processor 130 may output the sound again or maintain a state where the output of the sound is stopped.

When it is identified that the voice of the talker who utters the registered word is not the voice of the registered talker (no at operation S340), the processor 130 may control the output interface 120 to output a voice notification at operation S360.

In this case, the talker who is calling the user may not be specified, and accordingly, a voice notification different from that in a case where the voice of the talker who utters the registered word is the voice of the registered talker may be output.

Figure 4B:
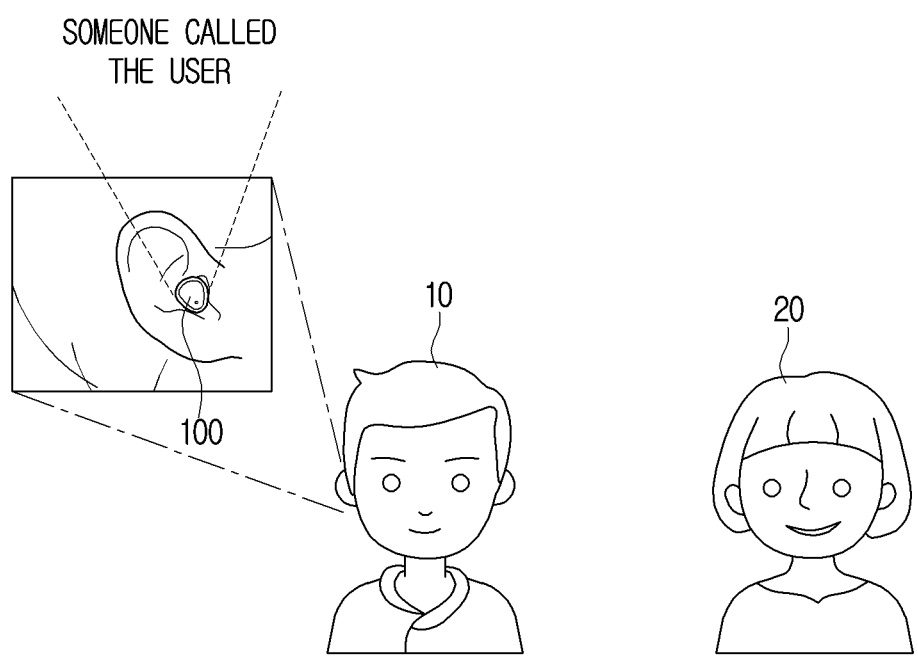

Specifically, the voice notification may include a voice notification for notifying that someone is calling the user. For example, referring to FIG. 4B, the processor 130 may output a voice notification "some called the user" via the output interface 120.

In this case, if the sound is being output via the output interface 120, the processor 130 may stop the output of the sound which was being output via the output interface 120 and output the voice notification via the output interface 120. After the voice notification is output via the output interface 120, the processor 130 may output the sound again or maintain a state where the output of the sound is stopped.

In addition, when it is identified that the voice of the talker who utters the registered word is not the voice of the registered talker, the processor 130 may register the talker who utters the registered word using the voice received via the microphone 110 at operation. In other words, the processor 130 may store the voice information of the talker in the electronic device 100.

Specifically, when the talker calls the user, the user may subsequently have a conversation with the talker. The conversation may be carried out between the user and the talker who called the user or between a plurality of persons with additional other persons.

In this case, the processor 130 may detect a plurality of voices from the audio signal received via the microphone 110.

When the conversation is carried out one on one, a plurality of voices detected from the audio signal may include the voice of the user and the voice of the talker who called the user. In addition, when the conversation is carried out between the plurality of persons, the plurality of voices detected from the audio signal may include the voice of the user, the voice of the talker who called the user, and the voice of other persons.

In this case, the processor 130 may cluster the plurality of voices detected from the audio signal into a plurality of groups.

Specifically, the processor 130 may obtain a feature vector from each of the plurality of voices and cluster the plurality of voices into the plurality of groups based on the obtained feature vectors. For example, the processor 130 may cluster the plurality of voices into the plurality of groups so that voices having feature vectors with a distance equal to or less than a predetermined value belongs to the same group. In this case, because every person has a unique voice feature, the plurality of voices may be divided into the plurality of groups by each person who utters the voice, when dividing the plurality of voices according to the feature vectors representing the voice characteristics.

The processor 130 may output at least one voice included in each of the plurality of groups via the output interface 120.

In this case, the processor 130 may output at least one voice included in each group via the output interface 120 in the order of a group including a relatively large number of voices among the remaining groups other than the group to which the user of the electronic device 100 belongs.

For this, the memory 140 may store information on voice characteristics (e.g., feature vectors) of the user of the electronic device 100.

Accordingly, the processor 130 may determine the group including at least one voice having a voice characteristic most similar to the voice characteristic stored in the memory 140 among the plurality of groups, as the group including the user's voice. The most similar voice characteristics herein may imply that a distance between feature vectors is shortest. In other words, the processor 130 may determine the group including the feature vector having the shortest distance with the feature vector stored in the memory 140 among the plurality of groups as the group including the user's voice.

When a user's voice for selecting one of the remaining groups and a user's voice indicating information on a talker who utters at least one voice included in the selected group are received via the microphone 110, the processor 130 may store the at least one voice included in the selected group in the memory 140 and perform registration for the talker.

The information on the talker herein may include a word referring to the talker. For example, the information on the talker may include a word that is normally used by another person to call the user, such as a name, a position, and the like of the user.

For this, the processor 130 may perform voice recognition for the user's voice.

The voice recognition herein may be performed through an automatic speech recognition (ASR) module and a natural language understanding (NLU) module.

The ASR module may convert a detected voice signal into a text (character string) of words or phoneme sequences by using a language model and an acoustic model. The language model may be a model to allocate a probability to the word or phoneme sequence and the acoustic model may be a model representing a relationship between a voice signal and a text for the voice signal. These models may be configured based on probabilities and statistics or artificial neural networks.

The NLU module may identify meanings of words or sentences configuring the text by using various analysis methods such as morphological analysis, syntactic analysis, semantic analysis, and the like for the converted text, and grasp the intent of the voice based on the identified meanings.

For example, if a user's voice "Register the voice just output as BBB" is received via the microphone 110, the processor 130 may identify a group to which the voice output via the output interface 120 before receiving the user's voice belongs, store at least one voice included in the identified group in the memory 140 as voice information for BBB, and register BBB. Accordingly, the BBB may be included in the registered talkers.

Meanwhile, the processor 130 may output various guide voices via the output interface 120 in a process of registering the talker.

For example, the processor 130 may output a voice instruction for guiding that a talker's voice is necessary to register the talker, for example, a voice "You need to have enough conversation with your partner to talker registration" via the output interface 120. In addition, the processor 130 may output a voice instruction for guiding information on a progress of the talker registration via the output interface 120.

Through the method described above, the processor 130 may register a new talker and then identify whether the voice of the talker who utters the registered word is the voice of the registered talker by using this.

Meanwhile, in the above example, it is described that the talker is registered by using the voice received via the microphone 110, however this is merely an example, and the electronic device 100 may register the talker by using a voice obtained during telephone conversation.

Specifically, while the user is having a conversation with another user on the telephone by using the electronic device 100 through an external device such as a smartphone or the like connected to the electronic device 100, the processor 130 may store the other user's voice received from the external electronic device in the memory 140.

During the process of registering the talker, the processor 130 may output the other user's voices stored in the memory 140 via the output interface 120, and when a user's voice for selecting at least one of the output voices is received via the microphone 110, the processor 130 may store the selected voice in the memory 140 to perform the registration for the talker.

Figure 5:
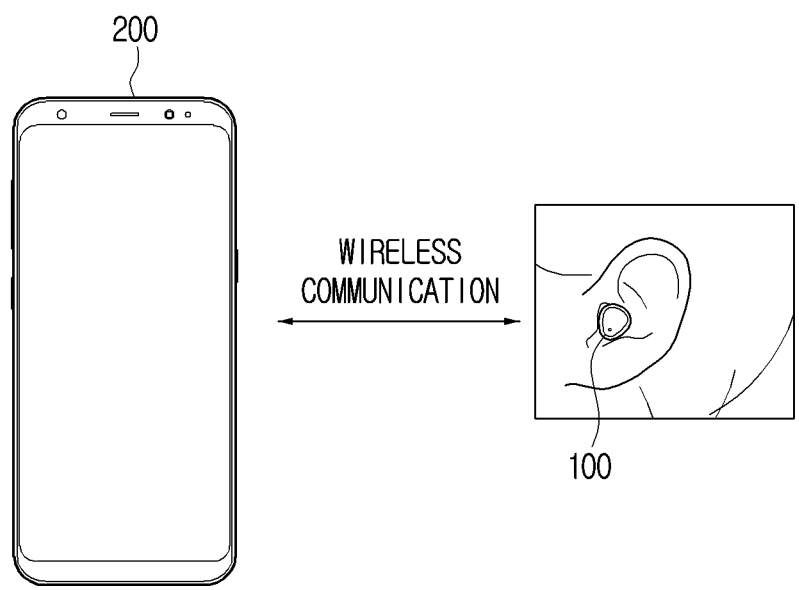
FIG. 5 is a diagram illustrating an operation of the electronic device associated with an external electronic device according to an embodiment.

FIG. 5 is a diagram illustrating an operation of the electronic device associated with an external electronic device according to an embodiment.

Referring to FIG. 5, the electronic device 100 may communicate with the electronic device 200. For this, the electronic device 100 may further include a communication interface 150, as shown for example in FIG. 7. The communication interface 150 may refer to an element which communicates with the electronic device 200 by a wired communication method or a wireless communication method. The communication interface 150 may transmit data to the electronic device 200 or receive data from the electronic device 200. For example, the electronic device 200 may receive a music content from a server which provides a music content streaming service and transmit the received music content to the electronic device 100. In this case, the processor 130 may control the output interface 120 to output the music content received from the electronic device 200.

According to an embodiment of the disclosure, the electronic device 100 and the electronic device 200 may associate with each other. In other words, the operations described above may be divided and the electronic device 100 and the electronic device 200 may perform the operations. The electronic device 200 may be implemented as various devices such as a server device or a user's smartphone, or the like.

In an example, at least one of an operation of identifying the voice of the talker who utters the registered word from the audio signal received via the microphone 110 by using the first neural network model, an operation of generating the converted voice by using the second neural network model, and an operation of identifying whether the voice of the talker who utters the registered word is the voice of the registered talker by using the third neural network model may be performed on the electronic device 200.

For this, the electronic device 200 may store at least one of the first to third neural network models in advance. In this case, the electronic device 100 may transmit the audio signal received via the microphone 110 or the voice of the talker who utters the registered word to the electronic device 200. In addition, the electronic device 200 may transmit information indicating whether the voice of the talker who utters the registered word identified from the audio signal, the voice generated by the voice conversion, and the voice of the talker who utters the registered word is the voice of the registered talker and the like to the electronic device 100.

Meanwhile, in the above embodiments, it is described that the electronic device 100 is implemented as earphones or headphones, but this is merely an example, and the electronic device 100 may be implemented as a device such as a smartphone, a tablet personal computer (PC), or the like.

In this case, the electronic device 100 may perform the operations described above by communicating with an external electronic device such as earphones or headphones.

Specifically, the electronic device 100 may identify the audio signal received by the external electronic device as the voice of the talker who utters the registered word from the external electronic device and identify whether the talker who utters the registered word is the registered talker. In addition, the electronic device 100 may transmit a voice notification to the external electronic device according to whether the talker who utters the registered word is the registered talker. Accordingly, the user wearing the earphones or headphones may hear the voice notification.

Meanwhile, when it is identified that the talker who utters the registered word is not the registered talker, the electronic device 100 may display a user interface (UI) screen for registering the talker on a display of the electronic device 100.

For example, the electronic device 100 may receive the audio signal received by the external electronic device from the external electronic device and cluster the plurality of voices included in the received audio signal into the plurality of groups. The electronic device 100 may transmit at least one voice included in the plurality of groups to the external electronic device. The external electronic device may output the voice received from the electronic device 100.

Figure 6A:
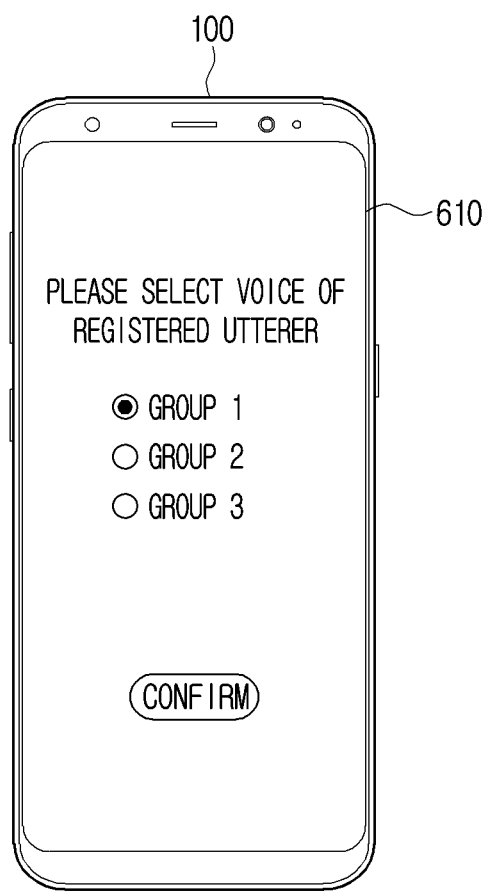
FIGS. 6A and 6B are diagrams illustrating examples of a UI screen displayed on the electronic device according to an embodiment.
Figure 6B:
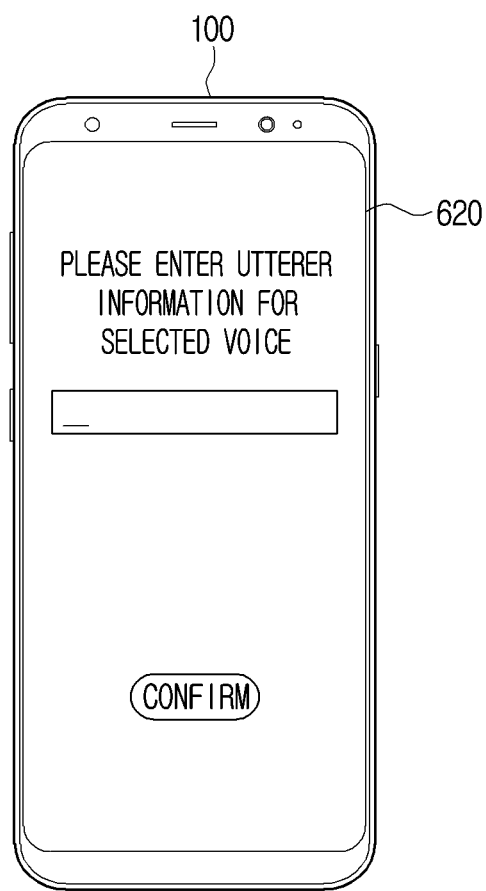

In this case, referring to FIG. 6A, the electronic device 100 may display a UI screen 610 for receiving selection of a group. Referring to FIG. 6B, when one group is selected through the UI screen 610, the electronic device 100 may display a UI screen 620 for receiving an input of information on the talker of the voice included in the selected group. Accordingly, when the information on the talker is input through the UI screen 620, the processor 130 may store at least one voice included in the selected group in the memory 140 to perform the registration for the talker.

Figure 7:
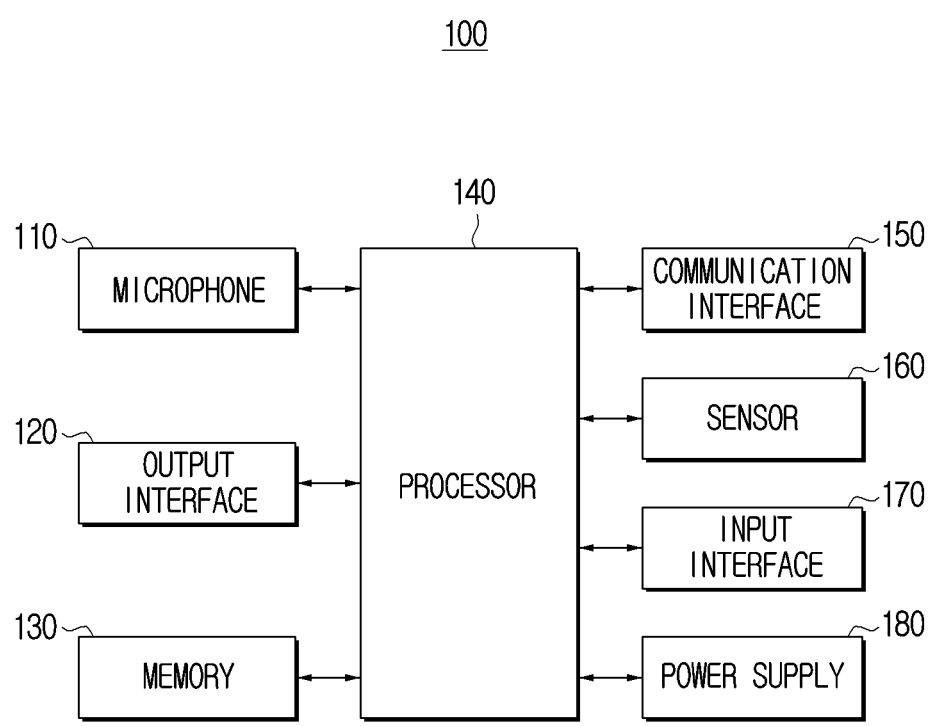
FIG. 7 is a block diagram illustrating an additional configuration of the electronic device according to an embodiment.

FIG. 7 is a block diagram illustrating an additional configuration of the electronic device according to an embodiment.

Referring to FIG. 7, the electronic device 100 according to an embodiment of the disclosure may further include the memory 140, the communication interface 150, a sensor 160, an input interface 170, a power supply 180, and the like, in addition to the microphone 110, the output interface 120, and the processor 130. However, the above configuration is merely an example. In performing the disclosure, new constituent elements may be added to the above configuration or some constituent elements may be omitted.

The memory 140 may be an element for storing an operating system (OS) for controlling general operations of the constituent elements of the electronic device 100 and various pieces of data related to the constituent elements of the electronic device 100.

For this, the memory 140 may be configured as hardware for temporarily or permanently storing data or information. For example, the memory 140 may be implemented as at least one hardware among a non-volatile memory, a volatile memory, a flash memory, a hard disk drive (HDD) or a solid state drive (SSD), a RAM, a ROM, and the like.

Meanwhile, the memory 140 may store various pieces of data for the operations of the electronic device 100.

For example, the memory 140 may store data for the registered word, voice data of the registered talker, neural network models, and various modules such as the TTS module, the ASR module, the NLU module, and the like.

The communication interface 150 may communicate with various types of external devices according to various types of communication methods to transmit and receive various types of data. The communication interface 150 may include at least one of circuits for performing various types of wireless communication such as a Bluetooth module (Bluetooth or Bluetooth low energy method), a Wi-Fi module (Wi-Fi method), a wireless communication module (cellular method such as 3G, 4G, or 5G), a near field communication (NFC) module (NFC method), an infrared module (infrared method), a zigbee module (zigbee method), an ultra-wide band module (UWB method), an ultrasonic module (ultrasonic method), and the like, and an Ethernet module, a USB module, a high definition multimedia interface (HDMI), a DisplayPort, D-subminiature (D-SUB), Digital Visual Interface (DVI), Thunderbolt, and a component which perform wired communication.

The sensor 160 may be implemented as various sensors such as a motion sensor. For example, the motion sensor may detect a movement distance, a movement direction, a tilt, and the like of the electronic device 100. For this, the motion sensor may be implemented as an acceleration sensor, a gyro sensor, an electromagnetic sensor, or the like. However, the implementation example of the sensor 160 is merely an embodiment and the sensor 160 may be implemented as various types of sensors, without any limitation.

The input interface 170 may receive various user commands and transfer the user commands to the processor 130. In other words, the processor 130 may recognize a user command input from the user via the input interface 170. The user command may be implemented by various methods such as a touch input of a user (touch panel), an input of pressing a key or a button, an input of a voice uttered by the user, and the like.

The power supply 180 may supply or stop the power with respect to each constituent element of the electronic device 100. The power supply 180 may include a battery for supplying the power and the battery may be charged according to a wired charging method or a wireless charging method.

Figure 8:
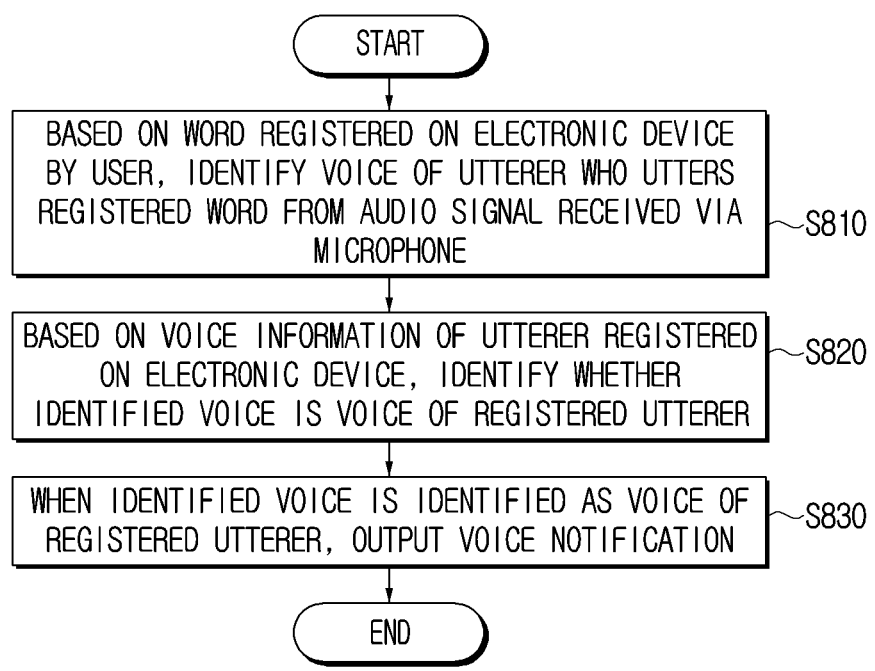
FIG. 8 is a flowchart illustrating a method for controlling the electronic device according to an embodiment.

FIG. 8 is a flowchart illustrating a method for controlling the electronic device according to an embodiment.

First, based on a word registered on the electronic device 100 by the user, a voice of a talker who utters the registered word is identified from an audio signal received via a microphone at operation S810. The registered word may include a word referring to the user.

Based on voice information of a talker registered on the electronic device 100, it may be identified whether the identified voice is a voice of the registered talker at operation S820).

When the identified voice is identified as the voice of the registered talker, a voice notification is output at operation S830. The voice notification may include a voice notification for notifying that the registered talker is calling the user.

Meanwhile, in the operation S810, the voice for the registered word may be input to the first neural network model to obtain an output value (a first output value) from the first neural network model, the voice received via the microphone may be input to the first neural network model to obtain an output value (a second output value) from the first neural network model, and the voice of the talker who utters the registered word may be identified from the audio signal received via the microphone based on the obtained output values.

Meanwhile, the voice for the registered word may be obtained based on at least one of a text and a user's voice input to the electronic device to register the word.

In the operation S820, the voice for the registered word and the voice information of the registered talker may be input to the second neural network model to obtain a voice converted from the voice for the registered word based on a voice style of the registered talker, and it may be identified whether the identified voice is the voice of the registered talker based on the obtained voice.

In the operation S820, the converted voice may be input to the third neural network model to obtain an output value (a third output value) from the third neural network model, the identified voice may be input to the third neural network model to obtain an output value (a fourth output value) from the third neural network model, and it may be identified whether the identified voice is the voice of the registered talker based on the obtained output values.

Meanwhile, the voice information of the registered talker may include a voice uttered by the registered talker.

When it is identified that the identified voice is not the voice of the registered talker, the voice information of the talker may be stored in the electronic device 100 by using the talker's voice received via the microphone.

Meanwhile, the method for identifying the voice of the talker who utters the registered word from the audio signal received via the microphone, identifying whether the identified voice is the voice of the registered talker, and providing a voice notification has been described above in detail.

As described above, according to various embodiments of the disclosure, when the voice for the registered word, that is, a predetermined keyword is received, the electronic device may identify whether the talker who utters the predetermined keyword is the registered talker. In other words, the talker recognition is performed under consideration of word uttered by the user, that is, only in a case where a specific keyword is uttered, and therefore, a talker recognition rate may be comparatively excellent.

In addition, when the talker who utters the predetermined keyword is the registered talker, the electronic device may provide a voice notification for notifying that the registered talker is calling the user to the user. Therefore, the user may recognize the situation in which someone is calling the user, while wearing the electronic device, thereby enhancing the convenience of the user.

Meanwhile, the functions related to the neural network model described above may be performed through the memory and the processor. The processor may be formed of one or a plurality of processors. The one or the plurality of processors may be a general-purpose processor such as a CPU, an AP, or the like, a graphic dedicated processor such as a GPU, a VPU, or the like, or an artificial intelligence dedicated processor such as an NPU, or the like. The one or the plurality of processors may perform control to process the input data according to a predefined action rule stored in the non-volatile memory and the volatile memory or an artificial intelligence model. The predefined action rule or the artificial intelligence model is formed through training.

Being formed through training herein may, for example, imply that a predefined action rule or an artificial intelligence model for a desired feature is formed by applying a learning algorithm to a plurality of pieces of training data. Such training may be performed in a device demonstrating artificial intelligence according to the disclosure or performed by a separate server and/or system.

The artificial intelligence model may include a plurality of neural network layers. The each layer has a plurality of weight values, and executes processing of the layer through a processing result of a previous layer and processing between the plurality of weight values. Examples of the neural network may include convolutional neural network (CNN), a deep neural network (DNN), recurrent neural network (RNN), restricted Boltzmann machine (RBM), deep belief network (DBN), bidirectional recurrent deep neural network (BRDNN), and deep Q-network, but the neural network of the disclosure is not limited to the above examples, unless otherwise noted.

The learning algorithm may be a method for training a predetermined target machine (e.g., robot) by using a plurality of pieces of training data to allow the predetermined target device to determine or predict by itself. Examples of the learning algorithm include supervised learning, unsupervised learning, semi-supervised learning, or reinforcement learning, but the learning algorithm of the disclosure is not limited to the above examples, unless otherwise noted.

The machine-readable storage medium may be provided in a form of a non-transitory storage medium. Here, the "non-transitory" storage medium is tangible and may not include signals (e.g., electromagnetic wave), and this term does not distinguish that data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloading or uploading) through an application store (e.g., PlayStore™) or directly between two user devices (e.g., smartphones). In a case of the on-line distribution, at least a part of the computer program product (e.g., downloadable app) may be at least temporarily stored or temporarily generated in a machine-readable storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration.

Operations performed by a module, a program, or other elements, in accordance with various embodiments, may be performed sequentially, in a parallel, repetitive, or heuristically manner, or at least some operations may be performed in a different order, omitted, or may add a different operation.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments.

In a case where the instruction is executed by a processor, the processor may perform a function corresponding to the instruction directly or using other elements under the control of the processor. The instruction may include a code made by a compiler or a code executable by an interpreter. While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a microphone;
an output interface; and
a processor configured to:
obtain a plurality of audio signals through the microphone; and
cluster the plurality of audio signals as a plurality of groups, based on feature vectors of the plurality of audio signals,
wherein the processor is further configured to:
based on a word registered on the electronic device by a user, detect a voice of a talker who utters the registered word from an audio signal received through the microphone;
based on voice information of a registered talker who is registered on the electronic device, determine whether the detected voice is a voice of the registered talker;
based on determining that the detected voice is the voice of the registered talker, control the output interface to output a voice notification; and
based on determining that the detected voice is not the voice of the registered talker, receive a command for registering voice information of the talker through the microphone; and
based on the command, register information about the talker and a group corresponding to the voice of the talker from among the plurality of groups, and
wherein the registered word refers to the user.

2. The device according to claim 1, wherein the voice notification indicates that the registered talker is calling the user.

3. The device according to claim 1, wherein the processor is further configured to:
input a voice for the registered word to a first neural network model and obtain a first output value from the first neural network model;
input a voice obtained using the microphone to the first neural network model and obtain a second output value from the first neural network model; and
detect the voice of the talker who utters the registered word from the audio signal received through the microphone based on the first output value and the second output value.

4. The device according to claim 3, wherein the processor is further configured to obtain the voice for the registered word based on at least one of a text and a voice of the user that is input to the electronic device to register the word.

5. The device according to claim 1, wherein the processor is further configured to:
input the voice for the registered word and the voice information of the registered talker to a second neural network model and obtain a converted voice that is converted from the voice for the registered word based on a voice style of the registered talker; and
determine whether the detected voice is the voice of the registered talker based on the converted voice.

6. The device according to claim 5, wherein the processor is further configured to:
input the converted voice to a third neural network model and obtain a third output value from the third neural network model;
input the detected voice to the third neural network model and obtain a fourth output value from the third neural network model; and
determine whether the detected voice is the voice of the registered talker based on the third output value and the fourth output value.

7. The device according to claim 5, wherein the voice information of the registered talker comprises a voice uttered by the registered talker.

8. The electronic device according to claim 1, wherein a new registered talker is registered to a group selected by the user from among the plurality of groups displayed in a user interface.

9. A method for controlling an electronic device comprising a microphone, the method comprising: obtaining a plurality of audio signals through the microphone; clustering the plurality of audio signals as a plurality of groups, based on identifying feature vectors of the plurality of audio signals; based on a word registered on the electronic device by a user, detecting a voice of a talker who utters the registered word from an audio signal received through the microphone; based on voice information of a registered talker who is registered on the electronic device, determining by the electronic device whether the detected voice is a voice of the registered talker; and based on determining that the detected voice is the voice of the registered talker, outputting a voice notification; and based on determining that the detected voice is not the voice of the registered talker, receiving a command for registering voice information of the talker through the microphone, wherein the command comprises an input of information about a group including the voice of the talker from among the plurality of groups, and an input of information about the talker, and wherein the registered word refers to the user.

10. The method according to claim 9, wherein the voice notification indicates that the registered talker is calling the user.

11. The method according to claim 9, further comprising:
inputting voice for the registered word to a first neural network model and obtaining a first output value from the first neural network model;
inputting a voice obtained using the microphone to the first neural network model and obtaining a second output value from the first neural network model; and
identifying the voice of the talker who utters the registered word from the audio signal received through the microphone based on the first output value and the second output value.

12. The method according to claim 11, further comprising:
obtaining the voice for the registered word based on at least one of a text and a voice of the user that is input to the electronic device to register the word.

13. The method according to claim 9, further comprising:
inputting the voice for the registered word and the voice information of the registered talker to a second neural network model and obtaining a converted voice that is converted from the voice for the registered word based on a voice style of the registered talker; and
determining whether the detected voice is the voice of the registered talker based on the converted voice.

14. The method according to claim 13, further comprising:
inputting the converted voice to a third neural network model and obtaining a third output value from the third neural network model;

inputting the detected voice to the third neural network model and obtaining a fourth output value from the third neural network model; and determining whether the detected voice is the voice of the registered talker based on the third output value and the fourth output value.

15. The method according to claim 13, wherein the voice information of the registered talker comprises a voice uttered by the registered talker.

* * * * *